United States Patent [19]

Takano

[11] 4,237,719

[45] Dec. 9, 1980

[54] APPARATUS FOR TESTING POWER TRANSMISSION BELTS

[75] Inventor: Hiroshi Takano, Miki, Japan

[73] Assignee: Mitsuboshi Belting Limited, Kobe, Japan

[21] Appl. No.: 955,056

[22] Filed: Oct. 26, 1978

[30] Foreign Application Priority Data

Oct. 26, 1977 [JP] Japan .......................... 52/144392[U]

[51] Int. Cl.³ ...................... G01N 3/56; G01M 13/02
[52] U.S. Cl. .......................................... 73/7; 73/118; 73/812
[58] Field of Search ................... 73/810, 812, 851, 9, 73/7, 118, 134, 133 R, 162

[56] References Cited

U.S. PATENT DOCUMENTS

| 2,603,084 | 7/1952 | Waddell | 73/9 X |
| 2,638,005 | 5/1953 | King et al. | 73/118 X |
| 3,739,632 | 6/1973 | Miller et al. | 73/136 A |

Primary Examiner—Charles A. Ruehl
Attorney, Agent, or Firm—Sughrue, Rothwell, Mion, Zinn and Macpeak

[57] ABSTRACT

An apparatus for testing power transmission belts is disclosed, wherein a drive belt is mounted between at least one drive motor and at least one intermediate shaft, and a test belt is mounted between at least one driven motor and said intermediate shaft. A variable load is applied to the test belt by causing an r.p.m. differential between the motors and a slippage of the belts with respect to pulleys secured to the drive and driven motors and the intermediate shaft.

25 Claims, 10 Drawing Figures

APPARATUS FOR TESTING POWER TRANSMISSION BELTS

BACKGROUND OF THE INVENTION

This invention relates to an apparatus for testing power transmission belts, such as frictional power transmission belts, in the form of V belts or flat belts and rotation timing transmission belts, and more particularly to a type thereof in which a drive belt is mounted between at least one drive motor and at least one intermediate shaft, while a test belt is mounted between at least one driven motor and the intermediate shaft to investigate belt fatigue by applying various loads to the test belt by means of producing an r.p.m. differential between these motors.

According to conventional apparatuses for testing the running state of a frictional power transmission belt, the belt to be tested is mounted between a drive pulley secured to a drive motor and a driven pulley whose shaft is applied to a given load in order to generate an r.p.m. differential between the pulleys. This load is produced by connecting a water wheel to the shaft of the driven pulley. This system is a so-called "water brake" tester. However, in this system, it would be rather difficult to apply various loads to the test belt due to the limited capacity of the water wheel, and further, the amount of electric power consumption would be large for testing the belt.

SUMMARY OF THE INVENTION

It is therefore an object of this invention to overcome the above-mentioned drawbacks and to provide an improved apparatus for testing power transmission belts.

This object is attained in accordance with this invention by providing at least two single-phase or three-phase induction motors and at least one intermediate shaft. A drive belt is mounted between the drive motor and the intermediate shaft, and a test belt is mounted between the driven motor and the intermediate shaft. A continuously variable-speed pulley is fixed to the drive motor to generate an r.p.m. or rotational timing differential between the motors under by controlling the tension of the drive belt, to thereby generate slippage of the belts, whereby available load is applied to the test belt to investigate the belt fatigue. Further, according to this invention, one of the motors can serve as a dynamo, so that the electric power generated thereby can be recirculated into the other motor by a suitable feed back circuit, whereby electric power consumption is reduced.

This invention will be described with respect to the drawings and the description of the preferred embodiments that follows.

DETAILED DESCRIPTION OF THE PREFERRED EMBODIMENTS

Figure 1:
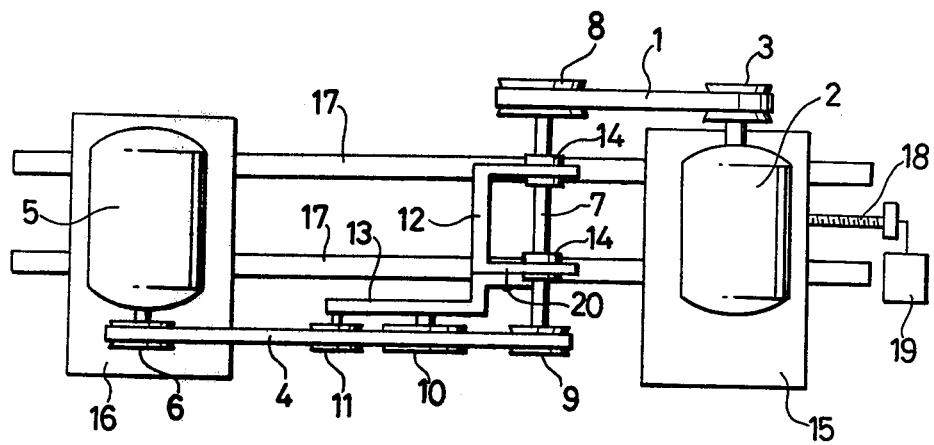
FIG. 1 shows a plan view of an apparatus for testing power transmission belts according to the present invention.
Figure 2:
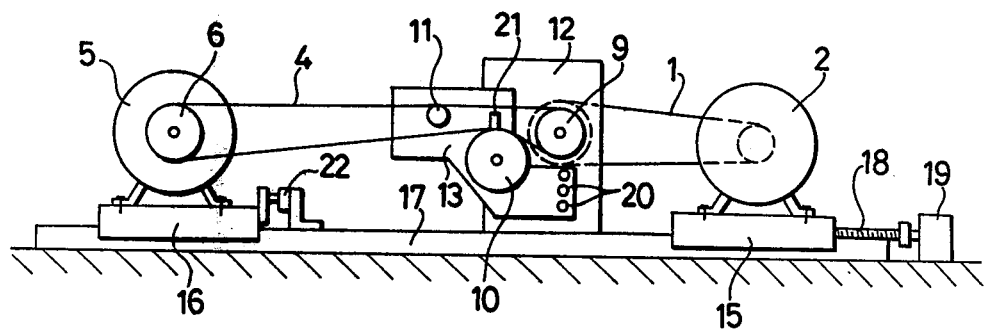
FIG. 2 shows a front view of the apparatus shown in FIG. 1.

Referring now to the drawings and initially to FIGS. 1 and 2, a drive motor 2 and a driven motor 5 are respectively mounted on bases 15 and 16 slidably disposed on rails 17. The drive motor 2 is provided with a drive pulley 3 and the driven motor 5 is provided with a driven pulley 6. These motors are single-phase or three-phase induction motors.

The base 15 mounting the drive motor 2 is provided with an adjusting screw 18 connected to a geared motor 19 to control the position of the motor 2, while the base 16 mounting the driven motor 5 is provided with a load cell 22 to detect tension applied to a test belt 4.

Between the motors 2 and 5, an intermediate shaft 7 is disposed, both ends of which are provided with intermediate pulleys 8 and 9. The shaft 7 is supported by bearings 14 and 14 diposed at an upper portion of a shaft supporting table 12 fixed to the rail 17. A stationary tension pulley 11 and a movable tension control pulley 10 are rotatably secured to a pulley-support table 13 extending from the shaft supporting table 12. The table 13 is fixedly secured to the table 12 by bolts 20. The tension control pulley 10 is vertically movable within a slot 21 formed in the pulley-support table 13 to control tension applied to the test belt 4.

A frictional power transmission belt such as a V-belt, a flat belt and a variable speed belt is mounted between the drive pulley 3 and the intermediate pulley 8 as a drive belt 1, while a frictional power transmission belt such as a V-belt, a flat belt, and a poly-V-belt having a zig-zag pattern in a cross section at the inner portion thereof, or a rotational timing transmission belt is mounted between the driven pulley 6 and the intermediate pulley 9 as the test belt 4. The stationary tension pulley 11 contacts the inner surface of the test belt 4, while the movable tension control pulley 10 contacts an outer surface of the test belt 4 to upwardly urge the same for its tension control.

Figure 3:
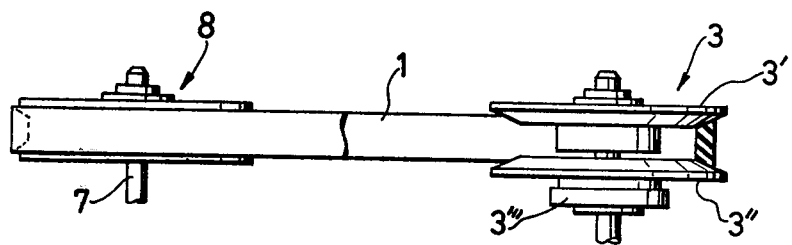
FIG. 3 shows a plan view of an assemblage of a drive pulley and a pulley secured to an intermediate shaft and a belt mounted between these pulleys according to the present invention.

In FIG. 3, the drive belt 1 is shown mounted between the drive pulley 3 and the intermediate pulley 8. The drive pulley 3 has a V-shape groove in cross-section to receive the drive belt and is divided into flange portions 3' and 3". The flange 3" is movable with respect to the motor shaft and is urged by a spring 3'" toward the flange 3' to perform a continuously variable speed operation. That is, when the distance between the flanges is changed, the belt is moved in the radial direction of the pulley 3 to change the rotational diameter thereof, to thereby cause a time lag between the rotations of the drive and driven motors, so that desired load is applied to the test belt 4.

The intermediate pulley 8 has a V-shape groove in cross section to permit mounting of the ordinary V belt.

In operation, the distance between the flanges 3' and 3" of the drive pulley 3 (variable speed pulley) is controlled by changing tension of the drive belt 1. The tension of the drive belt 1 is controlled by sliding the base 15 by means of the adjusting screw 18 operated by the geared motor 19 in order to change the distance between the intermediate shaft 7 and the shaft of the drive motor 2. When the tension applied to the drive belt is increased by increasing this distance, load applied to the drive pulley 3 is increased to separate the flange 3" apart from the flange 3'. That is, the drive belt 1 is radially moved toward the center of the pulley 3 to slidingly urge the flange 3" toward the direction opposite to the flange 3' against the biasing force of the spring 3''', so that the rotational diameter of the pulley 3 is reduced.

On the other hand, when the tension applied to the drive belt 1 is small, the force applied to the pulley 3 is insufficient to separate the flange 3" away from the flange 3', so that the rotational diameter of the pulley 3 is large.

The test belt 4 such as V-belt, flat belt, and poly-V-belt having zig-zag pattern in cross section is mounted between the driven pulley 6 and the intermediate pulley 9 through the stationary tension pulley 11 and the movable tension control pulley 10. The tension of the test belt 4 is controlled by vertically moving the tension control pulley 10 within the slot 21 upon detecting the tension of the test belt 4 by the load cell 22.

When the rotational diameter of the drive pulley 3 is changed by changing the tension of the drive belt 1 owing to the change of the distance between the intermediate shaft 7 and the shaft of the drive motor 2, the rotation ratio between the pulleys 3 and 8 is changed, which in turn, changes the rotational timing between the drive and the driven motors 2 and 5 through the intermediate shaft 7 due to the difference in r.p.m.'s of the two shafts. In this case, the drive belt 1 is slippingly driven between the pulleys 3 and 8, while, simultaneously, slippage occurs in the driven belt 4 with respect to the pulleys 6 and 9, and therefore, a load is applied to the test belt due to the r.p.m. differential between the shafts of the drive and the driven pulleys 3 and 6, whereby belt fatigue phenomena can be investigated.

If the drive belt 1 for controlling the load has a larger power transmission efficiency than that of the test belt 4, fatigue of the test belt is observed by visual inspection prior to the fatigue of the drive belt 1. Therefore, the load to be applied to the test belt 4 is determined only by the distance between the shaft of the motor 2 and the intermediate shaft 7 and the combination of the variable speed belt 1 and the variable speed pulley 3.

The control of the r.p.m. or rotation ratio between the drive and driven pulleys can also be achieved by coaxially providing a plurality of pulleys having different diameters with each other at the shaft of the motor 2 to realize limited step or stage speed control. Alternatively, the rotation ratio control can be achieved by suitably selecting the drive and driven belts.

In case of the employment of a timing transmission belt as a test belt, the above change of rotation ratio can be obtained by using toothed pulleys as the driven and intermediate pulleys.

Further, according to the present invention, one of the motors can be operated as a dynamo, while the other of the motor can be operated as an electric motor due to the difference of the rotational diameters of the pulleys. Namely, if the rotation number or r.p.m. of one of the pulleys exceeds the synchronous rotation number or r.p.m. thereof, electric power obtained by the one motor can be supplied into the other motor, to thereby reduce electric power consumption by a suitable feedback circuit.

The foregoing is described in terms of the combination of a single drive motor, a single driven motor and a single intermediate shaft. According to the present invention, however, the following combinations can be carried out as shown in Table.

| No. | Numbers of drive motor | Numbers of driven motor | Numbers of intermediate shaft |
|---|---|---|---|
| 1. | single | single | single |
| 2. | single | single | plural |
| 3. | single | plural | single |
| 4. | single | plural | plural |
| 5. | plural | single | single |
| 6. | plural | single | plural |
| 7. | plural | plural | single |
| 8. | plural | plural | plural |

FIGS. 4 through 9 show schematic views showing various combinations of the drive and driven motors and the intermediate shaft. For simplicity, the following abbreviations are used in the drawings.

Dr—a pulley secured to a drive motor
Dn—a pulley secured to a driven motor
X—a pulley secured to an intermediate shaft
$T_B$—a test belt
$D_B$—a drive belt.

Figure 4:
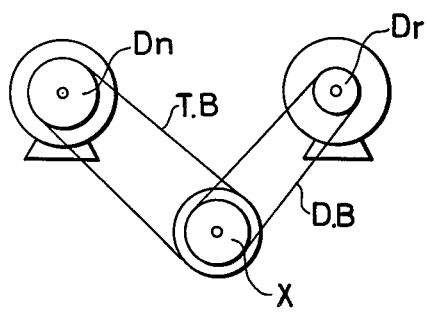
FIG. 4 is a schematic view showing one of the examples of belt mounting in which a single drive and driven motors and a single intermediate shaft are used.
Figure 5:
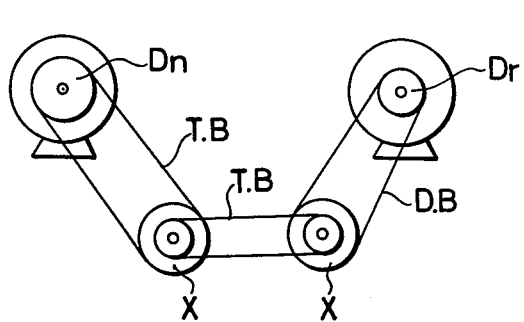
FIG. 5 is a schematic view showing another example of belts mounting according to the present invention in which single drive and driven motors and two intermediate shafts are used.

FIG. 4 corresponds to No. 1 in Table and FIG. 5 corresponds to No. 2, wherein a couple of intermediate shafts are provided, one of which is connected to the drive pulley by a drive belt while the other of which is connected to a driven pulley by a test belt. An additional test belt is also mounted between pulleys secured to the intermediate shafts.

Figure 6:
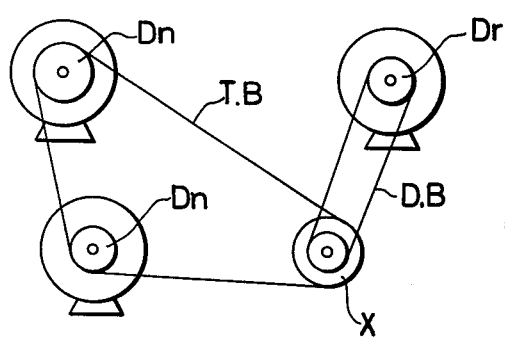
FIG. 6 is a schematic view showing another example of belts mounting according to the present invention in which a single drive motor, two driven motors and a single intermediate shaft are used.

FIG. 6 corresponds to No. 3 in Table, wherein a drive belt is mounted between the drive pulley and a first pulley secured to an intermediate shaft, while the test belt is mounted between two driven pulleys and a second pulley secured to the intermediate shaft.

Figure 7:
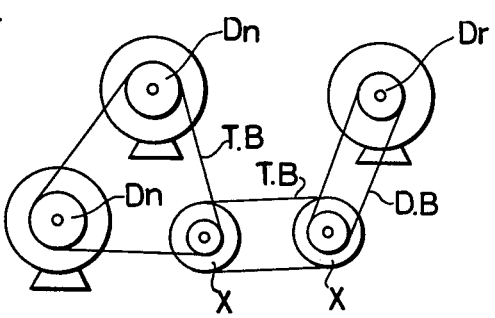
FIG. 7 is a schematic view showing another example of belts mounting according to the present invention in which a single drive motor, two driven motors and two intermediate shafts are used.

FIG. 7 corresponds to No. 4 in Table, wherein the drive belt is mounted between a drive pulley and a first pulley secured to a first intermediate shaft, while one of the test belts is mounted between two driven pulleys and a first pulley secured to a second intermediate shaft, and the other of the test belts is mounted between second pulleys each secured to the first and second intermediate shafts.

It is apparent that if the drive and driven belts shown in FIGS. 6 and 7 are replaced with each other, the examples of Nos. 5 and 6 shown in Table can be realized.

Figure 8:
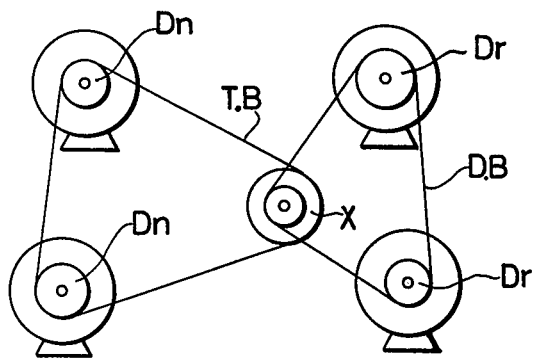
FIG. 8 is a schematic view showing another example of belts mounting according to the present invention in which pairs of drive and driven motors and a single intermediate shaft are used.
Figure 9:
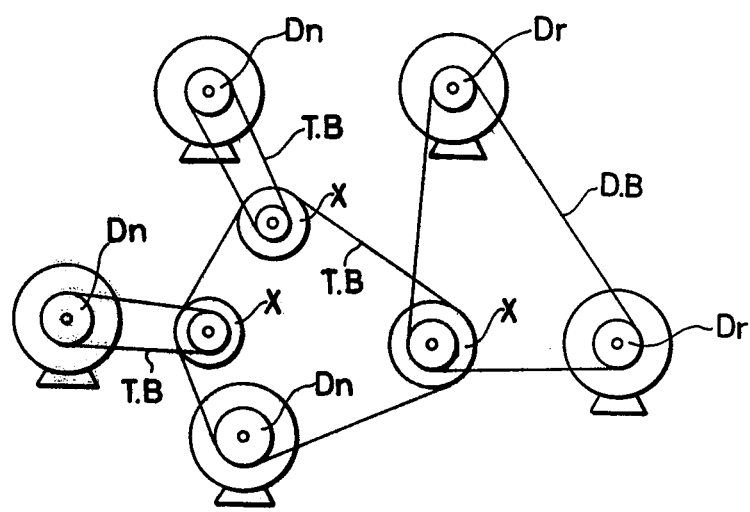
FIG. 9 is a schematic view showing another example of belt mounting according to the present invention in which a couple of drive motors, three driven motors and three intermediate shafts are used.

FIGS. 8 and 9 correspond to Nos. 7 and 8, respectively. In FIG. 8, a drive belt is mounted between a couple of drive pulleys and a first pulley secured to an intermediate shaft, while a test belt is mounted between a couple of driven pulleys and a second pulley secured to the intermediate shaft. In FIG. 9, a drive belt is mounted between a couple of drive pulleys and a first pulley of a first intermediate shaft, while a first test belt is mounted between a second pulley of the first intermediate shaft and a first pulleys of a second and a third intermediate shaft and a first driven pulley, and a second test belt is mounted between a second driven pulley and a second pulley of the second intermediate shaft, and a third test belt is mounted between a third driven pulley and a second pulley of the third intermediate shaft.

As is evident from these drawings, in case of the employment of a single intermediate shaft, a single test belt can be tested in the driven side, whereas in case of the employment of a plurality of intermediate shaft, a plurality of test belts can be simultaneously tested as shown in FIGS. 5, 7 and 9.

Figure 10:
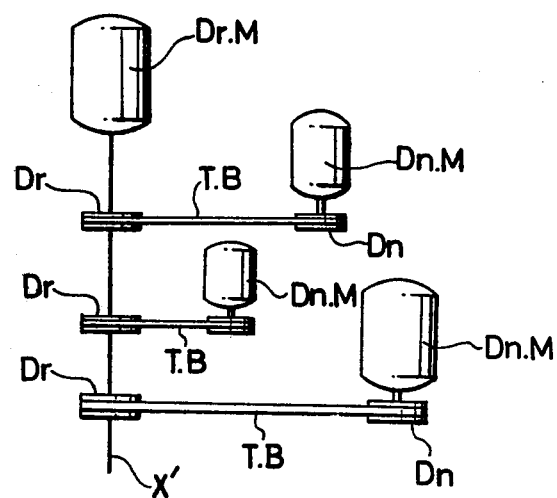
FIG. 10 is a schematic view showing still another example of belt mounting according to the present invention.

In FIG. 10, a shaft of a drive motor is extended to coaxially provide a plurality of drive pulleys. In this case, equal plurality of driven pulleys and corresponding driven motors are provided to mount an equal plurality of test belts.

The embodiments shown in FIGS. 4 thru 10 are particularly effective for testing belt efficiency to obtain the optimum rotation number of the pulleys adapted to mount the test belt, as well as to solve the spatial problem for accommodating the apparatus.

With the structure thus organized, various advantages are obtainable in the present invention as listed below.

(1) Since ordinary induction motors can be adopted in the apparatus, and since the apparatus is of simple structure because of the combination of these motors and the intermediate shaft(s), remarkably ecconomical apparatus results in comparison with the conventional apparatus.

(2) Since one of the motors functions as a dynamo, the electric power generated thereby can be utilized in the other motor by a suitable feed-back circuit, to thereby reduce electrical power consumption to less than about ⅓ of that required in the conventional "water brake" system.

(3) Since at least one intermediate shaft is provided, the length of the belt is easily controlled.

(4) Various kinds of belts can be adopted by replacing these pulleys with another kinds of pulleys.

(5) Desired slippage and load is applied to the test belt without applying external load, since the rotational diameter of the drive pulley can be easily controlled.

(6) The tension applied to the test belt is easily detected by the load cell disposed at the driven side, and the tension of the test belt is easily controlled by the movable tension control pulley.

(7) A plurality of test belts are simultaneously applied by providing a plurality of intermediate shafts even in the employment of a single drive belt.

It is apparent that modifications of this invention are possible without departing from the essential scope of the invention.

What is claimed is:

1. An apparatus for testing power transmission belts comprising:
   (a) at least one drive motor having a pulley secured to its motor shaft,
   (b) at least one driven motor having a pulley secured to its motor shaft,
   (c) at least one single-piece intermediate shaft having pulleys secured thereto, said intermediate shaft being disposed between said drive and driven motors,
   (d) a drive belt mounted between said pulley secured to said drive motor and one of said pulleys secured to said intermediate shaft, and
   (e) a test belt mounted between said pulley secured to said driven motor and the other of said pulleys secured to said intermediate shaft, whereby fatigue of the belt is observed by visual inspection thereof.

2. The apparatus as defined in claim 1, wherein said drive and driven motors are single-phase induction motors.

3. The apparatus as defined in claim 1, wherein said drive and driven motors are three-phase induction motors.

4. The apparatus as defined in claim 1, wherein said drive and driven motors and said intermediate shaft are each singularly provided.

5. The apparatus as defined in claim 1, wherein said drive and driven motors are each singularly provided while a plurality of said intermediate shafts are provided.

6. The apparatus as defined in claim 1, wherein said drive motor and said intermediate shaft are each singularly provided while a plurality of said driven motors are provided.

7. The apparatus as defined in claim 6, wherein said shaft of said drive motor is extended to function as said intermediate shaft to which a plurality of pulleys are coaxially secured.

8. The apparatus as defined in claim 1, wherein said drive motor is singularly provided, while a plurality of said driven motors and said intermediate shafts are provided.

9. The apparatus as defined in claim 1, wherein said driven motor and said intermediate shaft are each singularly provided, while a plurality of said drive motors are provided.

10. The apparatus as defined in claim 1, wherein said driven motor is singularly provided, while a plurality of said drive motors and said intermediate shafts are provided.

11. The apparatus as defined in claim 1, wherein said intermediate shaft is singularly provided, while a plurality of said drive and driven motors are provided.

12. The apparatus as defined in claim 1, wherein a plurality of said drive and driven motors and said intermediate shafts are provided.

13. The apparatus as defined in claim 1, wherein said drive belt is a variable speed belt.

14. The apparatus as defined in claim 1, wherein said drive belt is a V-belt.

15. The apparatus as defined in claim 1, wherein said drive belt is a flat belt.

16. The apparatus as defined in claim 1, wherein said test belt is a V-belt.

17. The apparatus as defined in claim 1, wherein said test belt is a flat belt.

18. The apparatus as defined in claim 1, wherein said test belt is a poly-V-belt.

19. The apparatus as defined in claim 1, wherein said test belt is a timing transmission belt.

20. The apparatus as defined in claim 1, wherein said pulley secured to said drive motor is a continuously variable speed pulley.

21. The apparatus as defined in claim 20, wherein said variable speed pulley is provided with flange portions, one of said flange portions being spring biased toward the other flange.

22. The apparatus as defined in claim 1, further comprising rail members, a first base adapted to mount said drive motor, said base being slidable on said rail members to control tension of said drive belt, and a second base adapted to mount said driven motor.

23. The apparatus as defined in claim 22, further comprising an adjusting screw connected to said first base, and a geared motor connected to said adjusting screw to move said first base on said rail members.

24. The apparatus as defined in claim 22, further comprising a load cell secured to said second base to detect tension of said test belt.

25. The apparatus as defined in claim 1, further comprising a table for supporting said intermediate shaft, a frame member fixedly secured to said table, a stationary tension pulley rotatably secured to said frame member, and a vertically movable tension control pulley rotatably secured to said frame member to control tension applied to said test belt.

* * * * *